US009852547B2

(12) United States Patent
Bostick et al.

(10) Patent No.: US 9,852,547 B2
(45) Date of Patent: Dec. 26, 2017

(54) PATH VISUALIZATION FOR AUGMENTED REALITY DISPLAY DEVICE BASED ON RECEIVED DATA AND PROBABILISTIC ANALYSIS (71) Applicant: International Business Machines Corporation, Armonk, NY (US)

(72) Inventors: James E. Bostick, Cedar Park, TX (US); John M. Ganci, Jr., Cary, NC (US); Sarbajit K. Rakshit, Kolkata (IN); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 28 days.

(21) Appl. No.: 14/665,423

(22) Filed: Mar. 23, 2015

(65) Prior Publication Data
US 2016/0284125 A1 Sep. 29, 2016

(51) Int. Cl.
*G06T 19/00* (2011.01)
*G06Q 50/00* (2012.01)
*G06F 3/01* (2006.01)
*G02B 27/01* (2006.01)
*G01C 21/00* (2006.01)

(52) U.S. Cl.
CPC ......... *G06T 19/006* (2013.01); *G01C 21/00* (2013.01); *G02B 27/0172* (2013.01); *G06F 3/011* (2013.01); *G06F 3/012* (2013.01); *G06Q 50/01* (2013.01); *G02B 2027/0178* (2013.01)

(58) Field of Classification Search
CPC .................................................. G06T 19/006
See application file for complete search history.

(56) References Cited

U.S. PATENT DOCUMENTS

| 2008/0204361 A1* | 8/2008 | Scales ............... F41G 3/165 345/8 |
| 2009/0018882 A1* | 1/2009 | Burton ............ G06Q 10/0633 705/7.27 |
| 2009/0319902 A1* | 12/2009 | Kneller ................. G06F 3/013 715/733 |

(Continued)

OTHER PUBLICATIONS 495 95 ExpressLanes, Using the Lanes, Internet Archive, https://web.archive.org/web/20150121001135/https://www.expresslanes.com/using-the-lanes, Jan. 21, 2015, pp. 1-3.*

(Continued)

*Primary Examiner* — Jeffery A Brier
(74) *Attorney, Agent, or Firm* — Daniel R. Simek (57) ABSTRACT

A computing device receives data regarding a destination, a current GPS location, map data of the current location and destination, and a direction and angle of view of an augmented reality display device. The computing device accesses social media content related to an area that includes the location and the destination, and analyzes the content to determine recent conditions and attributes associated with the location and destination area. The computing device determines a path from the location to the destination based on the map data, the current location and destination, and the social media content. The computing device sends information to display a virtual image of the path overlaid on a real-world view of the augmented reality display device, based on the direction of view and the incline level of view, of the augmented reality display device.

15 Claims, 7 Drawing Sheets

(56) References Cited

U.S. PATENT DOCUMENTS

| | | | | |
|---|---|---|---|---|
| 2010/0238161 A1* | 9/2010 | Varga | .................... | G06T 19/006 345/419 |
| 2010/0240988 A1* | 9/2010 | Varga | .................... | G02B 27/017 600/425 |
| 2010/0257252 A1* | 10/2010 | Dougherty | ......... | G06K 9/00979 709/217 |
| 2011/0052042 A1* | 3/2011 | Ben Tzvi | .............. | G06T 19/006 382/154 |
| 2011/0313649 A1* | 12/2011 | Bales | .................... | G01C 21/367 701/455 |
| 2012/0059720 A1* | 3/2012 | Musabji | ............. | G01C 21/3638 705/14.58 |
| 2012/0212414 A1 | 8/2012 | Osterhout et al. | | |
| 2012/0224060 A1* | 9/2012 | Gurevich | .................. | B60R 1/00 348/148 |
| 2013/0044128 A1 | 2/2013 | Liu et al. | | |
| 2013/0222369 A1* | 8/2013 | Huston | ................... | G06T 17/00 345/419 |
| 2013/0300637 A1* | 11/2013 | Smits | .................... | G03B 35/18 345/8 |
| 2014/0092134 A1* | 4/2014 | Nagasawa | .............. | B60K 35/00 345/633 |
| 2014/0236483 A1 | 8/2014 | Beaurepaire et al. | | |
| 2014/0240313 A1 | 8/2014 | Varga | | |

OTHER PUBLICATIONS

Brandom, Russell, "Using Google Glass: on a hiking trip, completely offline", Jun. 3, 2013, The Verge, <http://www.theverge.com/2013/6/3/4363276/using-google-glass-an-offline-hiking-trip>.

Hatmaker, Taylor, "5 Ways Google Glass Is Perfect for the Great Outdoors", Sep. 4, 2013, <http://readwrite.com/2013/09/04/google-glass-hiking-camping-mountaineering-nature#awesm=~oCdrcLDpleo2lv>.

McLaughlin, Dan, "Hiking with Google Glass", Published on Apr. 24, 2013, <https://www.youtube.com/watch?v=IEyd8banC-c>.

Voo, Brian, "Everything You Need to Know About Google Glass", provided by inventor in Main Idea, printed on Dec. 11, 2014, <http://www.hongkiat.com/blog/google-glass/>.

* cited by examiner

PATH VISUALIZATION FOR AUGMENTED REALITY DISPLAY DEVICE BASED ON RECEIVED DATA AND PROBABILISTIC ANALYSIS

BACKGROUND OF THE INVENTION

The present invention relates generally to the field of navigation systems, and more particularly to displaying virtual pathway information on an augmented reality display device.

When hiking there are many possible terrains and conditions that can make visually identifying the precise location of a trail or desired path very challenging. In some cases, the ambiguity of the trail location may create significant risk or be life threatening. For example, hikes in wooded areas with leaf-covered paths may greatly increase deviating from intended paths and getting lost. Use of hiking trails at night, snow covered trails, and adverse weather conditions can increase the risk of injury or result in fatal consequences.

Skiers may encounter variation in the difficulty ratings of ski slopes found at different ski resorts in which one resort may rate a slope with a high degree of difficulty, however, the same slope features may be rated less difficult at another resort. This may require a skier to adopt a more conservative approach and may require significant slope time to determine the most appropriate slopes for a particular skier's ability. Additionally, a skier may be unfamiliar with a choice of path to descend a particular slope that best matches the skier's preferences and enjoyment, or may wish to duplicate another's skier's path observed from a ski lift ride. Often such issues are left to the skier's judgment, experience, and memory.

Use of global positioning systems (GPS) to determine current location and directions to destinations can lack short distance details of trails. GPS devices operate based on a satellite navigation system that provides location and time information anywhere there is unobstructed line of sight access to four or more GPS satellites and is maintained by the United States government, and is accessible to anyone with a GPS receiver. Short distance details of trails may indicate easier or more difficult sections of a trail, or indicate the most commonly traveled trail. Devices that present map or satellite image information require handling and manipulation by the user's hands, and may lack or complicate determination of proper direction orientation of the user's perspective.

SUMMARY

According to one embodiment of the present invention, a method, computer program product, and system method for displaying a virtual path through an augmented reality display device is provided. The method for displaying a virtual path through an augmented reality display device includes a computing device that receives a first set of information that includes a destination, a location, as determined by a global positioning service (GPS), map data corresponding to the location and the destination, a direction of view of an augmented display device, and an incline angle of view of an augmented reality display device. The computing device determines a path from the location to the destination based on the map data, the location, and the destination. The computing device sends to an augmented reality display device, a second set of information to display a virtual image of the path, overlaid on a real-world view of the augmented reality display device, based on the direction of view and the incline angle of view of the augmented reality display device.

DETAILED DESCRIPTION

Embodiments of the present invention recognize that in particular situations, users in need of navigation assistance may be unable or unwilling to use their hands to manipulate and handle a device that offers limited information regarding the route or path being traversed. In subsequent discussion, a route refers to a particular sequence of paths taken to reach a destination. A path may be a section of a route, or may correspond to the entire route if there are no alternative paths, or if the view of the route is not segmented into sections. In some cases, a climber or hiker may need use of their hands to steady their stance, hold and use hiking poles, or safely secure themselves. In other cases, weather conditions may require the hiker to wear heavy gloves to protect against cold conditions, and a device used for navigation information may be stored in pockets and require holding and manipulation to access and display route information. Some navigation devices, such as a GPS display device, may be difficult to interpret, because the user may need to determine how to hold and orient the device in a precise direction so that the display aligns with an intended travel route.

Embodiments of the present invention include a hands-free personal navigation application operating in a mobile computing device that enables the overlay of a route or path in an augmented reality (AR) display device. An AR display device, such as "Google Glass"™, "MicroSoft Hololens", "Zeal Optics Goggles", and "Epson Moverio BT-200", for example, provides a real-world view of the wearer's environment, and supplements the view by adding computer-generated input, typically overlaid or added to the view of the environment. (Note: the terms "Google Glass", "Micro- Soft Hololens", "Zeal Optics Goggles", and "Epson Moverio BT-200", may be subject to trademark rights in various jurisdictions throughout the world and is used here only in reference to the products or services properly denominated by the marks to the extent that such trademark rights may exist). Embodiments of the present invention overlay a designated or selected navigation route, also referred to as a path or a trail, on an AR display device, enabling hands-free navigation information for a user wearing the AR device. Some embodiments include displaying an overview of an entire length of the path to be traversed as an overlay of the AR display view, whereas, in other embodiments, a near-distance overlay of a portion of the path and direction to traverse is displayed on the AR device.

Some embodiments of the present invention include receiving data from sensors and devices, which determines the location and orientation of the AR display device view, enabling an accurate overlay of a virtual path on the real-world environment as viewed through the AR display device. Some embodiments include receiving data from social media sources, which include posted information regarding a path or area to be traversed, and include utilizing semantic analysis and sentiment analysis of the social media content. The information regarding the path or area to be traversed is displayed on the AR display device as an overlay of the real-world view. Embodiments of the present invention provide useful service for hikers and climbers in remote areas. Some embodiments provide hands-free navigational information, and may illuminate or virtually display a path or trail in the AR display of all the possible paths from the viewer's visual perspective based on GPS coordinates, angle of the user's vision, and imported maps. Some embodiments of the present invention provide statistical analysis on the difficulty or risk of a path, as well as possible distances from flowing water, camp sites, or dangerous areas.

Embodiments of the present invention discussed herein by use of examples, are not intended to limit the applications and uses of a hands-free personal navigation enablement of AR display devices. Embodiments of the present invention are herein presented as examples to explain and describe function and features, and are not limiting, as additional embodiments may be possible.

Figure 1:
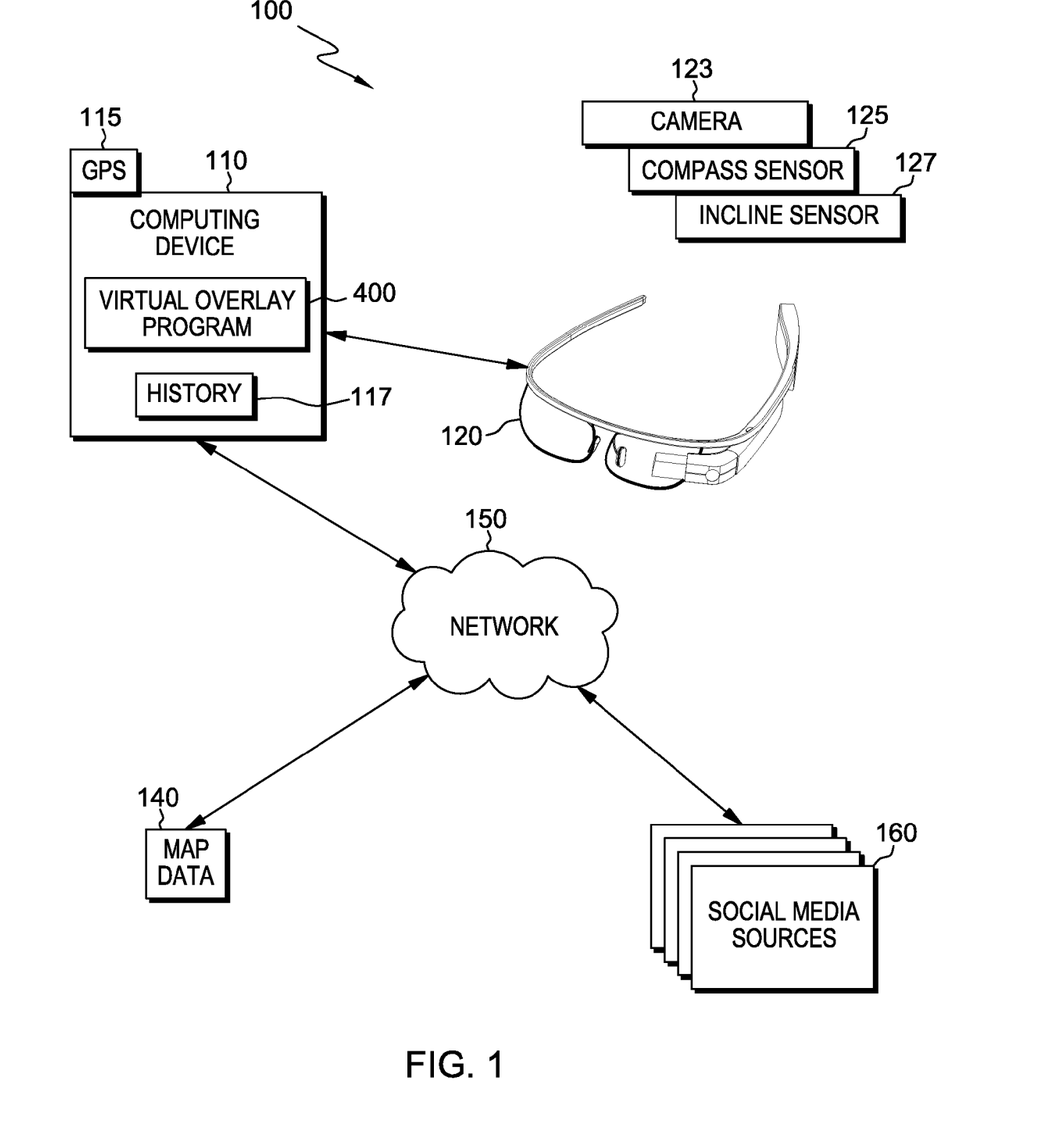
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110, which includes GPS 115, virtual overlay program 400, and history 117, augmented reality (AR) device display 120, which includes camera 123, compass sensor 125, and incline sensor 127, map data 140, and social media sources 160, all interconnected via network 150.

Network 150 may be, for example, a local area network (LAN), a telecommunications network, a wide area network (WAN), such as the Internet, a virtual local area network (VLAN), a cable broadcasting delivery network, a satellite broadcasting delivery network, or any combination that can include wired, wireless, or optical connections. In general, network 150 can be any combination of connections and protocols that will support communications between virtual overlay program 400 operating on computing device 110, AR display device 120, sensors 123, 125, and 127, map data 140 and social media sources 160, within distributed data processing environment 100, in accordance with embodiments of the present invention.

AR display device 120 is a wearable device through which a user views real-world surroundings within a location environment. AR display device 120 may be in the form of glasses, goggles, a helmet, a hat, or other wearable item that includes a see-through element on which a virtual image may be overlaid. AR display device is depicted in FIG. 1 as glasses, which are connected to computing device 110 by wired or wireless connection; however embodiments of the present invention enable various types of existing AR display devices and further enable such devices to include navigational virtual overlays and information associated with a particular path or trail.

In some embodiments, AR display device 120 receives virtual images from computing device 110, which overlay the viewable surrounding landscape of the location environment, indicating a path and direction associated with the navigation to a chosen or input destination. In some embodiments of the present invention, AR display device 120 displays virtual lines, arrows, shapes, or other virtual objects on the see-through element, effectively overlaying the viewable surrounding landscape and super imposing path or trail direction on the viewable landscape. The presentation and orientation of the virtual display of a path or trail is dependent on the orientation and incline of the line-of-sight of AR display device 120. If AR display device 120 is facing in a direction away from the direction of the path to be traversed toward a destination, the virtual display overlay will not appear; however, if AR display device 120 is oriented toward the path to be traversed, the virtual overlay of a path, for example, lines or arrows overlaying the path and indicating the direction to follow, is displayed on the see-through element.

In some embodiments of the present invention, AR display device 120 displays information associated with a path or trail being traversed. For example, distances to particular points along the path towards a destination may be displayed, along with information regarding water crossings, higher risk portions of the path or trail, and danger warnings. In other embodiments, information associated with the average time required to reach an indicated destination from the current location, following the displayed path, is displayed on AR display device 120. In yet other embodiments, multiple paths may be presented to a wearer of AR display device 120, offering options and indicating information associated with the path options, such as difficulty, speed of completion, and frequency of use by others.

Compass sensor 125 and incline sensor 127 are sensors associated with AR display device 120. Compass sensor 125 and incline sensor 127 provide input to virtual overlay program 400 regarding the directional orientation and incline of the line of sight of AR display device 120. In some embodiments of the present invention, sensors 125 and 127 are integrated with AR display device 120, and provide data to virtual overlay program 400 via the connection of AR display device 120 with computing device 110, which may be a wired or wireless connection. The wireless connection may be, for example, Bluetooth, Wi-Fi, 3G, 4G, or other telecommunication connection, satellite connection, or optical connection.

Camera 123 is depicted in FIG. 1 as being oriented in the same direction as the direction of view of AR display device 120. Camera 123 is capable of taking still images and continuous video and is connected to computing device 110. In one embodiment of the present invention, virtual overlay program 400 receives image and/or video input from camera 123, and by use of object recognition, may supplement downloaded map data in identifying and virtually displaying paths or trails on AR display device 120. In some embodiments, images from camera 123 of another person traversing an observed area are recorded and analyzed to identify, reproduce, and plot the path on the AR display device for the wearer to follow the same recorded path taken by the other person. For example, a user wearing AR display device 120 enabled with camera 123 views a skier descending a slope and following a particular path that appeals to the user. Camera 123 records the descent path of the skier and, after analysis by virtual overlay program 400, the same path is displayed for the user on AR display device 120 as the user descends the same slope, allowing the user to follow the same path previously observed.

In some embodiments of the present invention, camera 123 captures images of surrounding objects and compares the positions of the objects to information on downloaded map data to provide a more accurate set of navigation indicators. For example, camera 123 records images of bodies of water, man-made water crossings, tree lines, and sends the images to virtual overlay program 400 in computing device 110. Virtual overlay program 400 performs object recognition on the images, aligns the objects with GPS data, compass data, and downloaded maps, and adjusts virtual display of paths on AR display device 120 to more accurately align with the viewed surroundings.

Map data 140 includes detailed map information corresponding to areas that a user of AR display device 120 traverses. In some embodiments, map data 140 is downloaded in response to receiving input indicating the area to be traversed. The input may be by direct input of an area name, path name, GPS coordinates of a destination, direction and distance, or may be performed by a pre-designated set of gestures captured by camera 123 and interpreted by virtual overlay program 400. Map data 140 may include topography and features of the area to be traversed which, in some embodiments, may include, trails, paths, forest areas, moving water, water crossings, tree lines, rocky areas, open fields, roads, parks, campsites, sources of drinking water, and nearest point of help or assistance.

Social media source 160 is a collection of publicly available electronic media that includes postings, blogs, comments, forecasts, and general conditions information. In some embodiments, social media source 160 is a streaming data source of social media that includes, for example, but is not limited to, hiking and climbing blogs, ski blogs, and short messaging posts that are wirelessly received by computing device 110 hosting virtual overlay program 400. In other embodiments, social media source 160 is actively accessed by computing device 110 hosting virtual overlay program 400. The media content of social media source 160 is analyzed by virtual overlay program 400 to identify and interpret information that may be associated with the current path of navigation by a user wearing AR display device 120. The analysis includes parsing entries, and performing sematic analysis and sentiment analysis to determine whether information from social media source 160 corresponds to the current area and path of navigation and interprets the information. The information is presented virtually on AR display device 120 which, in some embodiments, may be initiated by a pre-designated hand or arm gesture of the user of AR display device 120.

Information from social media source 160 may include feedback from other persons that have traversed the same path or alternative paths within the same area. In some embodiments of the present invention, the information from the analysis of social media source 160 is used to indicate trails and paths that are in good condition, such as by a designated color of the path lines, for example, green overlaid on AR display device 120. Trails or paths in bad or dangerous condition may be depicted with a red color, for example. Social media source 160 may include recent changes to terrain or features that are not indicated in downloaded map data 140, such as landslides, washed out bridges, or extremely low water levels of rivers or creeks that allow easy crossing. Information from social media source 160 may be represented as color markings, text, symbols or other means to indicate to the user of AR display device 120 information to assist in the traverse of the path or trail.

Computing device 110 is a mobile computing device capable of receiving, analyzing, and sending data. In some embodiments of the present invention, computing device 110 is integrated with AR display device 120. In other embodiments computing device 110 is connected to AR display device 120 by wire or wirelessly connected, and may be attached to, worn, or included within other devices held or worn by the user of AR display device 120. For example, computing device 110 and AR display device 120 may be connected by Bluetooth technology.

In some embodiments, computing device 110 may connect with, and utilize, multiple computers as a server system, such as in a cloud computing environment. In another embodiment, computing device 110 may be a tablet computer, a netbook computer, a personal computer (PC), or any programmable electronic device capable of communicating with AR display device 120, map data 140, and social media source 160 via network 150, and capable of operating virtual overlay program 400. In another embodiment, computing device 110 is one element (connected wirelessly) of a computing system utilizing clustered computers and components (e.g., database server computer, application server computers, etc.) that act as a single pool of seamless resources when accessed within distributed data processing environment 100. Computing device 110 receives data to be analyzed and/or processed by virtual overlay program 400, hosted on computing device 110, and sends data to be displayed on AR display device 120. Computing device 110 may include internal and external hardware components, as depicted and described with reference to FIG. 5.

GPS 115 is a global positioning system (GPS) standard positioning service feature that determines an accurate location based on connection access to a set of orbiting satellites. In some embodiment of the present invention, GPS 115 is a feature of computing device 110 and provides location information to virtual overlay program 400. In other embodiments, GPS 115 is separate from, but connected to, computing device 110, and in yet other embodiments, GPS 115 may be integrated with or attached to AR display device 120.

History 117 is a collection of recorded paths or trails traversed by a user of AR display device 120 connected to computing device 110. History 117 may be a collection of files including information associated with the previous traverse of a route navigated with the use of AR display device 120. The information may include, for example, the direction, distance, and duration of traversing each segment of a trail or path, and may include images and/or video selected by the user of AR display device 120. In other embodiments, history 117 may be received from another source and include recorded data associated with paths or trails traversed by other users, enabling the current user of AR display device 120 to access and use history 117 to navigate a path followed by another user.

Virtual overlay program 400 receives information from map data 140, GPS 115, and input from compass sensor 125 and incline sensor 127, and provides a hands-free virtual overlay of a path or trail to a designated destination on a see-through component of the user view, as seen through AR display device 120. In some embodiments of the present invention, virtual overlay program 400 determines the view of the user of AR display device 120 from the input of compass sensor 125 and incline sensor 127, in combination with GPS 115 location information and map data 140. Virtual overlay program 400 determines the position of the path or trail to be followed, and overlays the path on the view of AR display device 120 when some or all of the path is within the real-world direction and incline view of AR display device 120.

In some embodiments, virtual overlay program 400 provides multiple paths to a designated destination based on information from map data 140, history 117, or based on content of social media source 160 that has been analyzed and determined to identify additional path options. In other embodiments, virtual overlay program 400 determines information from social media source 160 that may include one or more indications of locations or areas, such as areas of danger, areas warning, paths in good condition, water crossing sites, water supply, shelter, campsites, difficulty of a path, and recent conditions not indicated from map data 140, for example. In some embodiments, virtual overlay program 400 accesses and provides current and projected weather conditions associated with an area in which a trail or path targeted for traversing is located. Providing current information of rapidly changing weather conditions may enable better decision making. In yet other embodiments, virtual overlay program 400 provides informational data associated with a particular trail or set of trails, such as a standard rating and the percentage of the trail having that rating, statistics regarding the number of people ascending the particular trail, and accidents that are known to have occurred on the particular trail.

In some embodiments, virtual overlay program 400 determines and provides distance and duration information based on the input from one or a combination of GPS 115, map data 140, and social media sources 160. The distance of an entire path or trail may be determined and displayed on AR display device 120, or alternatively, the path may be displayed for the next one hundred feet, in response to a selection by the wearer of AR display device 120. In some embodiments, virtual overlay program 400 determines and displays the distance to a next turn or decision point, or the distance to an object of interest, such as a water supply, tree line, or summit.

As progress on a path or trail proceeds, relative duration estimates are determined, such as to a particular point on the path from the current location, or to the designated destination from the current location. Distance and duration information can be critical in some circumstances in which locations or altitudes are preferred to be avoided given daylight or weather conditions. Virtual overlay program 400 determines the altitude from the present position to a destination, and determines the duration estimate based on progress and difficulty of the traverse up to that point.

In some embodiments, selection of display options are received by virtual overlay program 400 by hand or arm gestures captured by camera 123 and interpreted by virtual overlay program 400. In other embodiments, particular head movements may be used for information display option selection. Embodiments of the present invention include option selection that is made using a hands-free technique that provides the virtual overlay display of path or information on a real-world scene as viewed through AR display device 120. For setup of preferences and setting, manual manipulation may be an augmented feature used as a preference, or before traversing a route.

Figure 2A:
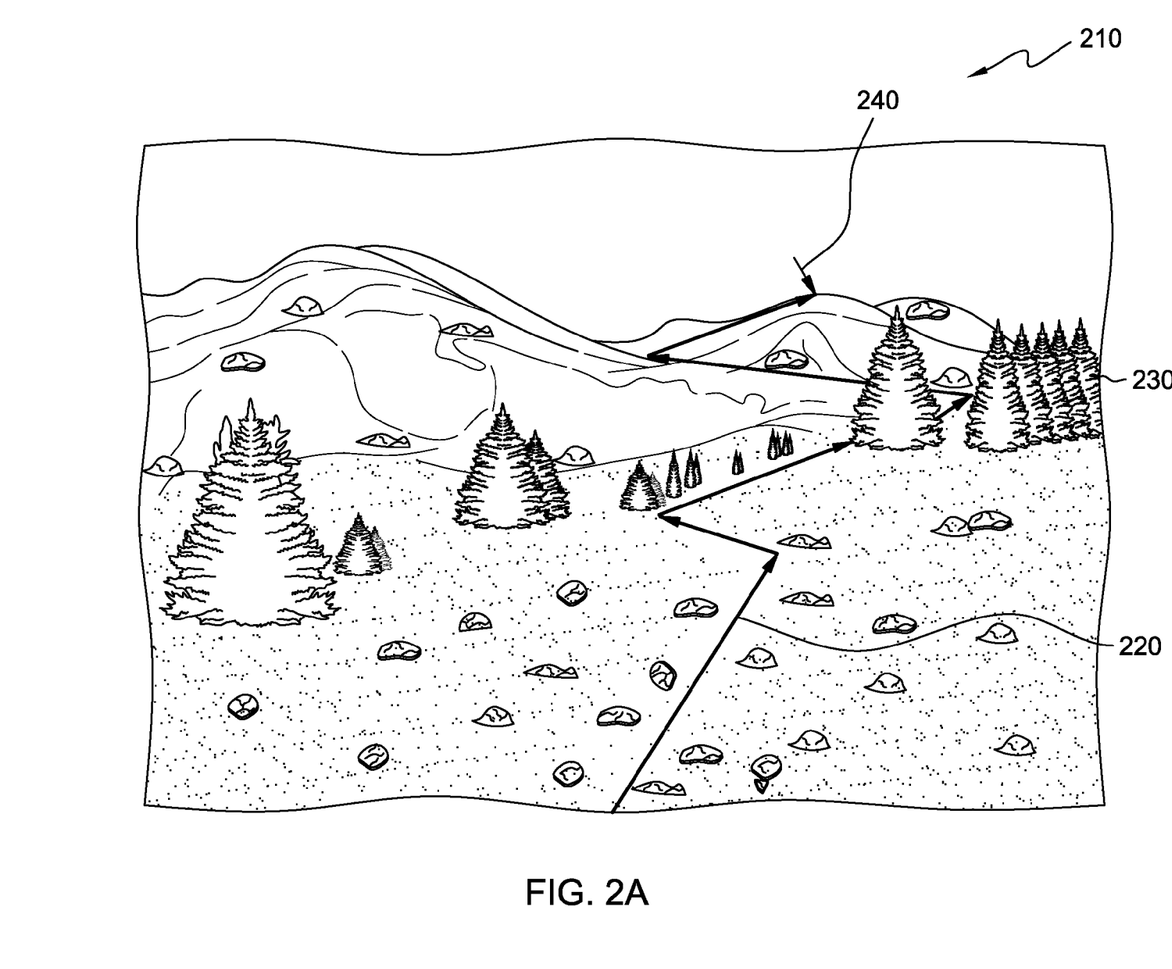
FIG. 2A depicts an example of a virtual overlay image of a travel route overview of mixed terrain, as viewed through an augmented reality display device, in accordance with an embodiment of the present invention.

FIG. 2A depicts an example of virtual overlay 210 of a travel route overview image of mixed terrain as viewed through an augmented reality (AR) display device, in accordance with an embodiment of the present invention. Virtual overlay 210 includes virtual path section 220, view obstruction 230, and destination 240. Virtual path section 220 is a displayed line overlaying a real-world view, aligning with a selected path to traverse to destination 240. Virtual path section 220 is a next-portion of the entire route and indicates a direction to a point at which a turn occurs and subsequent portion of the entire route begins. Virtual path section may be displayed in a particular color indicating information associated with the portion of the route, such as "easy", "difficult", "dangerous", "rocky", "muddy", "water-crossing", or other informative designation. As an alternative to displaying virtual path section 220 in color, the path portion may be presented as a dashed or dotted display, with different dash and dot combinations corresponding to various path conditions and/or attributes. The examples illustrated in FIG. 2A herein are used only for the clarity of the description and are not limited to the illustrative embodiments. Additional data, operations, actions, tasks, activities, and manipulations will be conceivable from this disclosure and the same are contemplated within the scope of the illustrative embodiments.

Obstruction 230 is a grouping of trees that obscures a portion of the route, preventing display of an entire overview of the route to the selected destination. Obstruction 230 may prevent viewing of route conditions that deserve consideration by the user, such as duration, elevation changes, difficulty, equipment needed, and potentially other considerations. In some embodiments of the present invention, virtual overlay program 400, in response to receiving a corresponding selection, for example, an uncommon hand or arm gesture viewed by camera 123, produces a temporary background display, overlaying obstruction 230, and displays the additional path sections on the background display (not shown), such that the entire route path sections are visible to the user of AR display device 120. Displaying the entire path route sections provides a more complete set of information to the user of AR display device 120.

Destination 240 marks the route destination. In some embodiments of the present invention, virtual overlay program 400 includes route information corresponding to destination 240 (not shown) which may include distance from current location to destination 240, elevation difference between current location and destination 240, additional features found on the current route to destination 240, and a duration estimate to reach destination 240.

Figure 2B:
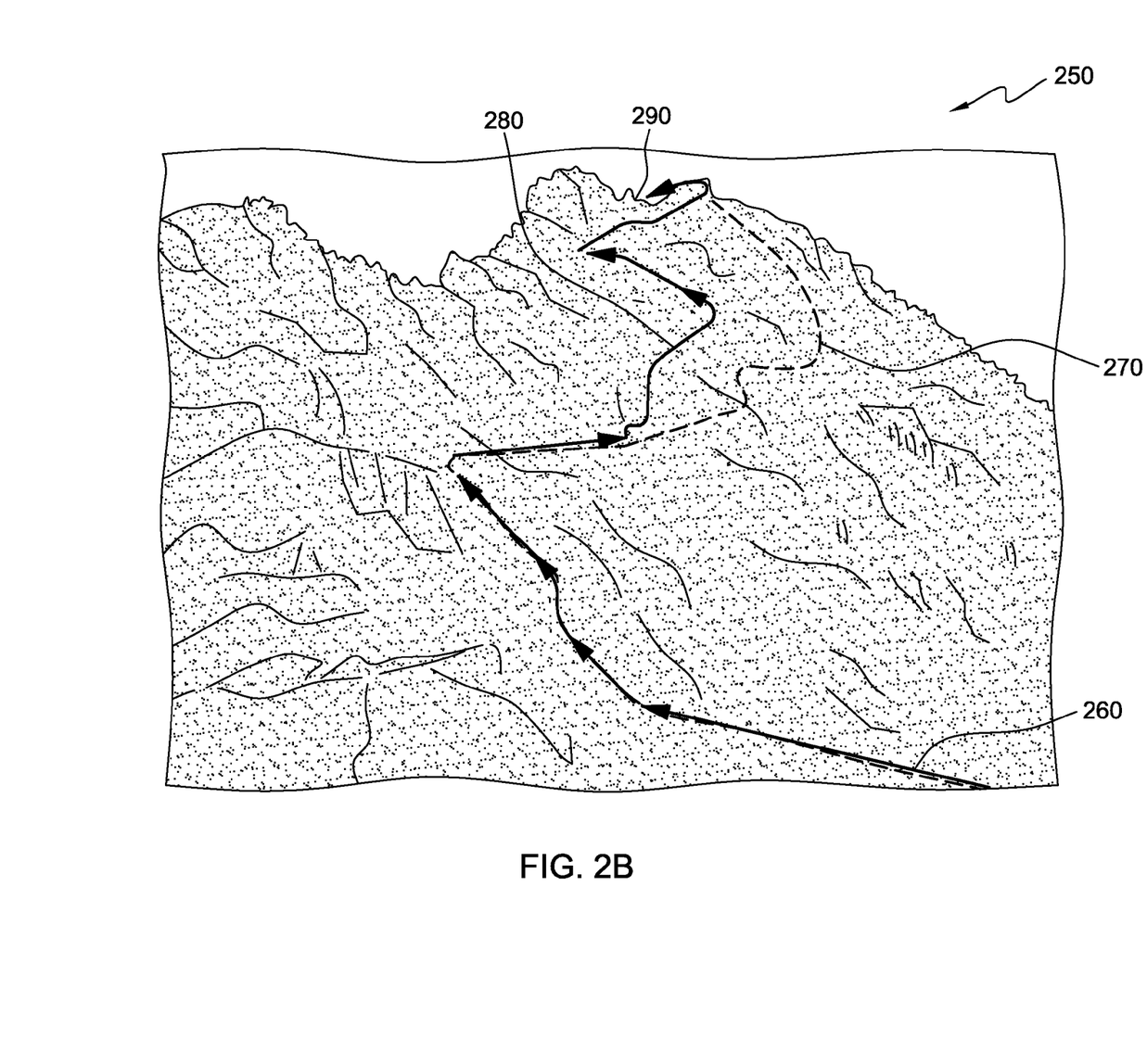
FIG. 2B depicts an example of a virtual overlay image of a near-distance route over steep rocky terrain, as viewed through an augmented reality display device, in accordance with an embodiment of the present invention.

FIG. 2B depicts an example of virtual overlay 250 of a near-distance route image over steep rocky terrain as viewed through an augmented reality display device, in accordance with an embodiment of the present invention. Virtual overlay 250 includes virtual path section 260, recommended path 280, alternate path 270 and destination point 290. Virtual path section 260 is displayed as a direction line overlaying a real-world view of rocky terrain. Virtual path section 260 is aligned to a selected path to traverse to destination 290. Virtual path section 260 is a portion of the entire route, and indicates a direction to a point at which a change of direction occurs and subsequent portion of the entire route begins. Virtual path section 260 is displayed as a solid line or a particular color to differentiate the path of which virtual path section 260 is part of from other possible paths, such as alternate path 270. The examples illustrated in FIG. 2B herein are used only for the clarity of the description and are not limited to the illustrative embodiments. Additional data, operations, actions, tasks, activities, and manipulations will be conceivable from this disclosure and the same are contemplated within the scope of the illustrative embodiments.

Alternate path 270 is displayed as a series of direction lines overlaying a real-world view of rocky terrain. Alternate path 270 presents an optional path, as determined by virtual overlay program 400, based on one, or a combination of, GPS input, map data, previous route history, and social media input. Alternate path 270 is displayed in a different color and/or different combination of dashes and dots than other path options. In some embodiments of the present invention, the color and/or dashes of alternate path 270 indicates a difficulty level, or a warning, based on difficulty level or history of others using alternate path 270.

Destination 290 marks the route destination. In some embodiments of the present invention, virtual overlay program 400 includes route information corresponding to destination 290 (not shown) which may include distance, elevation, duration, and additional features found on a route to destination 290.

Figure 3A:
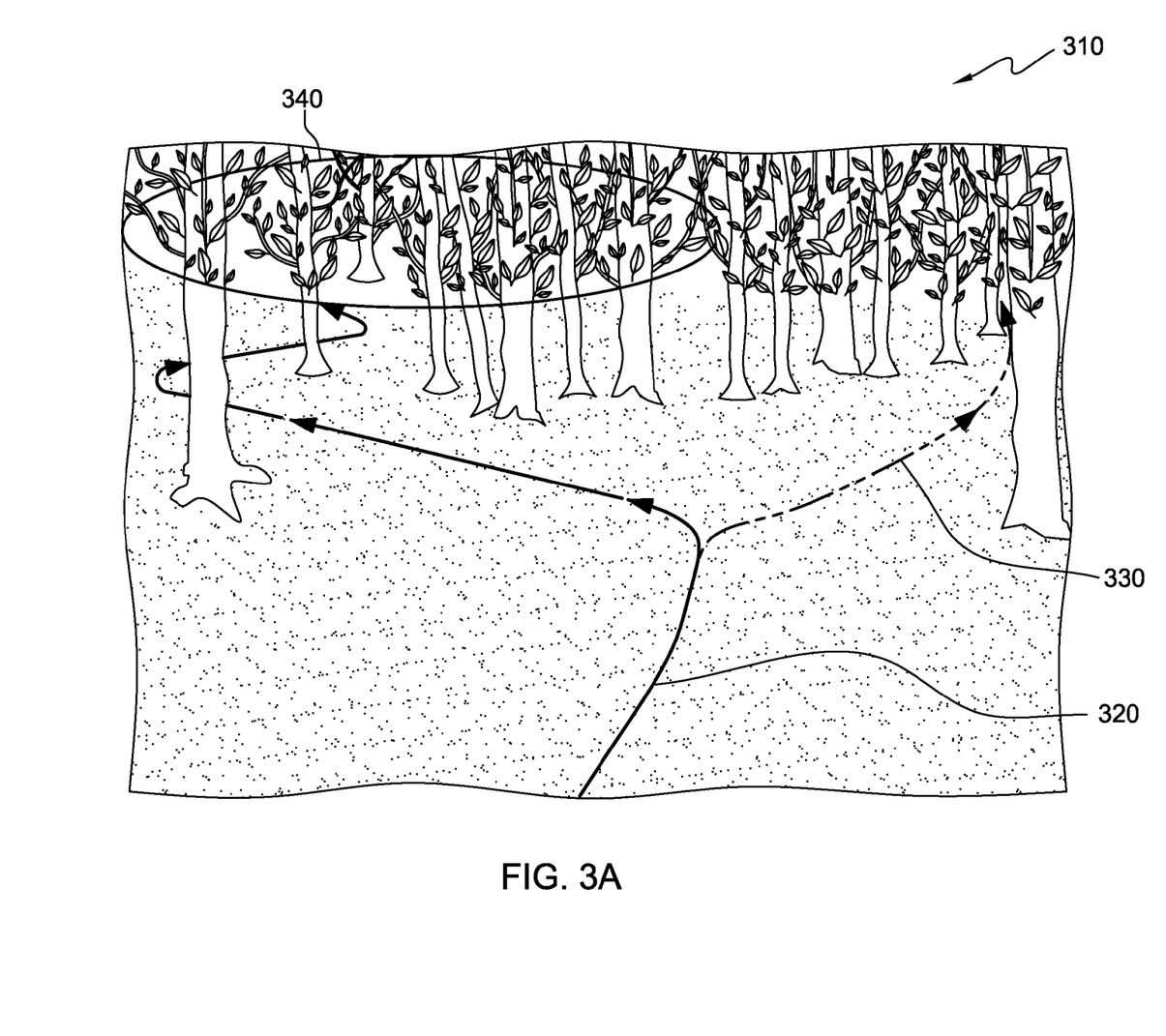
FIG. 3A depicts an example of an obscured route in wooded terrain, as viewed through an augmented reality display device, in accordance with an embodiment of the present invention.

FIG. 3A depicts an example of obscured route 310 in wooded terrain, as viewed through augmented reality display device 120, in accordance with an embodiment of the present invention. Obscured route 310 includes path section 320, alternate path 330, and obscured area 340. The examples illustrated in FIG. 3A herein are used only for the clarity of the description and are not limited to the illustrative embodiments. Additional data, operations, actions, tasks, activities, and manipulations will be conceivable from this disclosure and the same are contemplated within the scope of the illustrative embodiments.

Path section 320 is displayed as a direction line overlaying a section of a real-world wooded area view. Path section 320 is aligned to a selected path, and is one of a plurality of sections to traverse to a destination. Some path section overlays are visible within the view of obscured route 310; however, other section overlays are not visible due to the trees within the real-world view that act as view barriers. Path section 320 is a portion of the entire route, and indicates a direction to a point at which a change of direction occurs and a subsequent portion of the entire route begins. Path section 320 is displayed as a solid line or a particular color to differentiate the path of which path section 320 is part of, from the other possible paths, such as alternate path 330.

Alternate path 330 is displayed as a series of direction lines overlaying another pathway of a real-world wooded area view. Alternate path 330 presents an optional path, as determined by virtual overlay program 400, based on one or a combination of GPS input, map data, previous route history, and social media input. In some embodiments of the present invention, alternate path 330 is displayed in a different color and/or different combination of dashes and dots than other path options. The color and/or dashes of alternate path 330 may indicate an attribute of the route option, for example, difficulty level or a warning, based on social media postings by others using alternate path 330 or information available from national or state outdoor services and blogs regarding alternate path 330.

Obscured area 340 depicts an area within the real-world view in which portions of the route are obscured by a plurality of trees within the wooded area. Obscured area 340 prevents an overall view or an extended view of the route to be traversed, as well as obscuring some level of elevation changes, obstacles, and conditions that might affect decisions of which alternative path to follow.

Figure 3B:
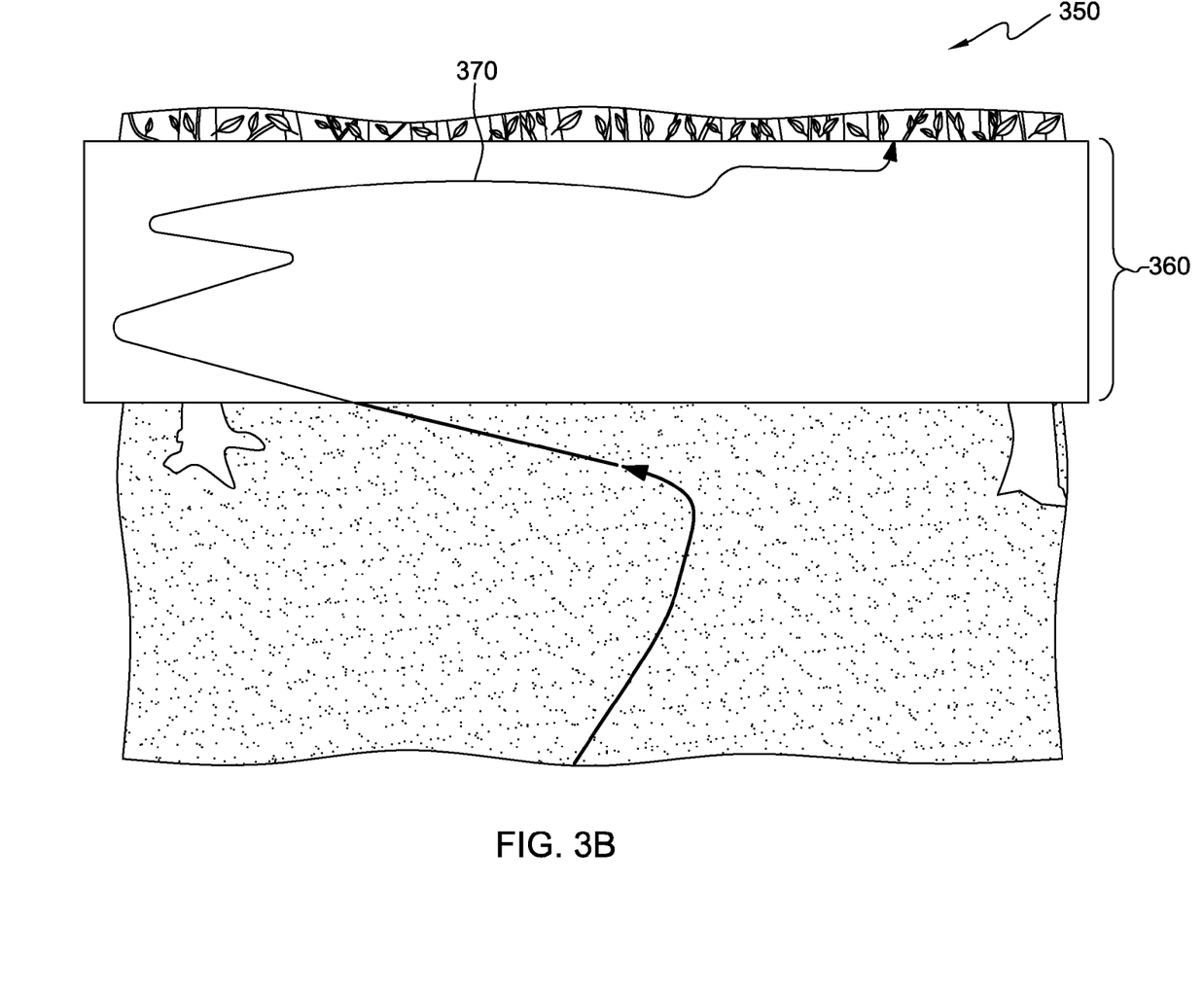
FIG. 3B depicts an example of a virtual overlay image removing the obscuring objects in the visible field of an augmented reality display device, in accordance with an embodiment of the present invention.

FIG. 3B depicts an example of virtual overlay image 350, removing the obscuring objects in the visible field of augmented reality display device 120, in accordance with an embodiment of the present invention. Virtual overlay image 350 includes temporary overlay 360 and non-obscured path 370. Temporary overlay 360 is a virtual removal of some or all of the real-world view through AR display device 120. Temporary overlay 360 creates a background that removes obstructing terrain or objects and plots path sections that indicate the route to be traversed. In one embodiment of the present invention, temporary overlay 360 is initiated by camera 123 detecting a particular hand or arm gesture. In other embodiments, camera 123, which is located on AR display device 120, detects head movements or a particular type or sequence to initiate temporary overlay 360. The examples illustrated in FIG. 3B herein are used only for the clarity of the description and are not limited to the illustrative embodiments. Additional data, operations, actions, tasks, activities, and manipulations will be conceivable from this disclosure and the same are contemplated within the scope of the illustrative embodiments.

Non-obscured path 370 is a virtual display of a route, or section of a route, to be traversed, overlaid on temporary overlay 360, such that previously obscured sections of the route are visible. Non-obscured path 370 provides an overall view of a route, or an extended section view of a route that otherwise is obscured by objects, terrain, or conditions. In some embodiments of the present invention, non-obscured path 370 is displayed in a different color and/or different combination of dashes and dots to indicate an attribute of the route.

Figure 4:
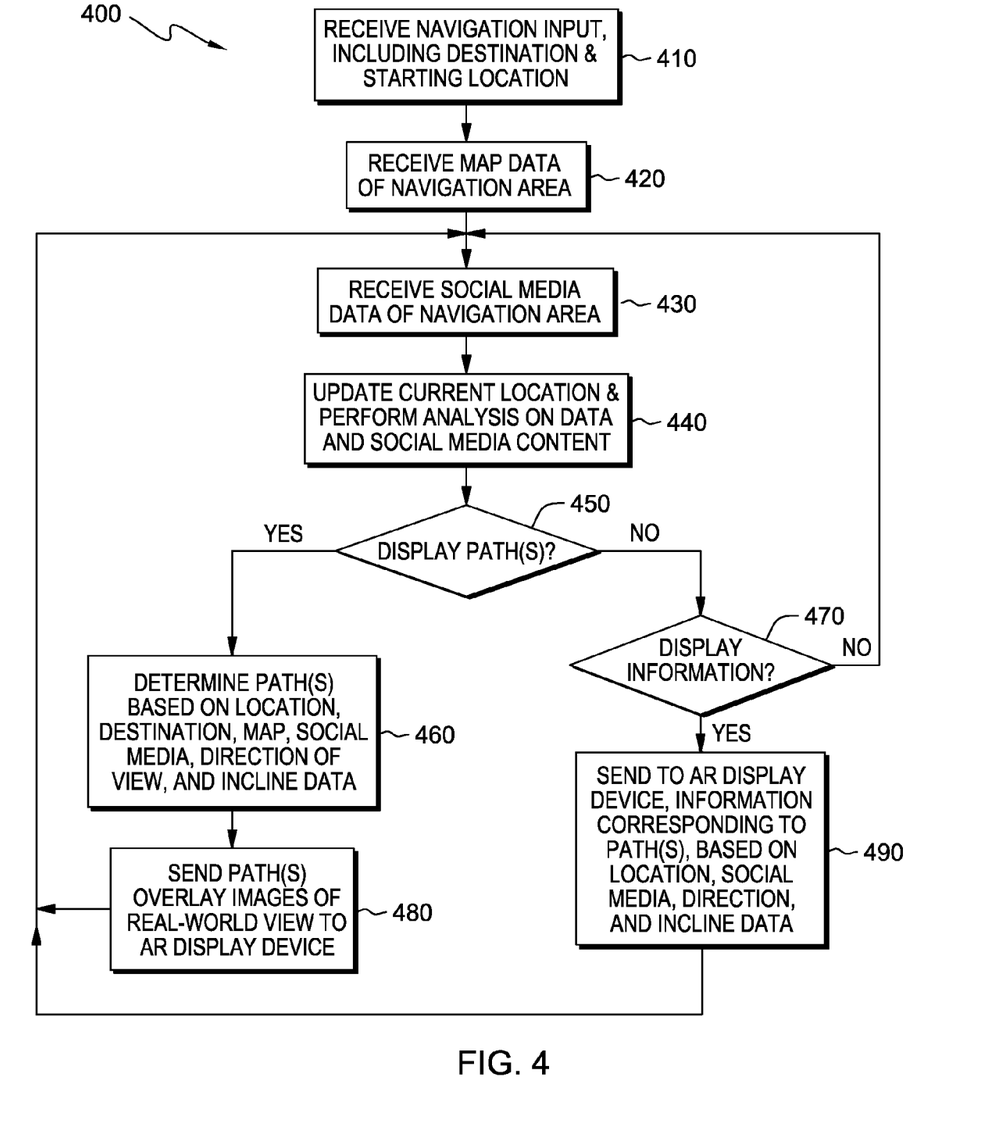
FIG. 4 illustrates operational steps of a virtual overlay program inserted on a computing device within the distributed data processing environment of FIG. 1, in accordance with an embodiment of the present invention.

FIG. 4 illustrates operational steps of virtual overlay program 400, inserted on computing device 110 within data processing environment 100 of FIG. 1, in accordance with an embodiment of the present invention. Virtual overlay program 400 receives navigation input, including destination and starting location (step 410). Navigation input is received from a user of computing device 110 connected to AR display device 120 which, in some embodiments of the present invention, includes information regarding a destination point, and an initial starting point. In other embodiments, the starting point is determined by input from GPS 115, and destination input may include receiving GPS coordinates of the destination point. In other embodiments, the route to be navigated may be identified by entry of a name or other identifying attribute that may be included in map data received from map data 140, for example.

Virtual overlay program 400 accesses map data corresponding to the navigation area (step 420). Having determined a destination and starting location, virtual overlay program 400 receives map data for the area of the starting and destination locations. The map data may include elevation data, terrain information, and notable locations and objects, such as water crossings, bridges, roads, ranger stations, campsites, and water sources, for example. The map data may also include indicators of difficult paths, areas of known danger, and other indicators of warning or avoidance. Virtual overlay program 400 orients the current location, the corresponding location of the map data, and the location of the destination.

Virtual overlay program 400 receives social media data of the navigation area (step 430). In some embodiments of the present invention, computing device 110 wirelessly connects to pre-determined social media sources identified in a setup step, for example, and enables virtual overlay program 400 to access content from hiking and climbing blogs, ski blogs, outdoor activity forums and blogs, comments associated with postings, as well as general information sites that may be provided by national or state park services, or weather condition providers. Streaming social media content for the area and route to be traversed may include recently posted comments regarding conditions or warnings associated with the route or particular paths.

Having received streaming social media data of the route area, virtual overlay program 400 updates the current location and performs analysis of the data and social media content (step 440). Virtual overlay program 400 obtains continual location data from GPS 115, and uses the location data in conjunction with available map data of the particular route areas, and performing analysis on the received social media content relevant to the particular route area. In some embodiments of the present invention, virtual overlay program 400 receives the social media content, and performs a syntactical analysis in which the content is parsed into individual words and their relative positions within the content. The words are assigned a type of speech, such as nouns, verbs, and whether they are included in phrases, such as prepositional phrases.

Virtual overlay program 400 determines keywords from the syntactical analysis, and applies semantic analysis techniques in which the contextual meaning of the words and phrases are determined. The semantic analysis identifies the social media content contributions directed to the area of the current location, the particular route being traversed, and potential path options that may be chosen. In combing the keywords and semantics of the content virtual overlay program 400 determines from the social media content, the subjects and messages having relevance to the potential paths. In some embodiments of the present invention, Virtual overlay program performs sentiment analysis on the social media content. Sentiment analysis uses natural language processing, text analysis and computational linguistics to identify and extract subjective information from the social media content, such as positive sentiment, negative sentiment, or sentiments of warning or danger. Virtual overlay program 400 formats and displays the information on AR display device 120.

In some embodiments of the present invention, social media data augments map data, providing specific and time-based information from others having first-hand knowledge of a particular route being traversed, and conditions affecting the particular route that may be a result from weather, events or experience from others. In instances in which information received from map data sources and social media analysis is conflicting, the most current and relevant data may receive precedence and be displayed. In other embodiments the conflicting information may be indicated and presented for a judgment decision by the user.

For example, virtual overlay program 400 receives Internet-based social media content from a hiking blog, which, in one embodiment of the present invention, may be accessed in preparation of the planned hike. The blog post, made one week earlier, includes comments made by a person having experience in hiking the same path. Virtual overlay program 400 parses the received blog content, determines the keywords from performing syntactical analysis, and associates words based on the entry in the blog and the relative position of words within the entry. Virtual overlay program 400 performs semantic analysis on the received social media content, and determines the entries associated with the particular planned hike of the user, and further determines the keywords and modifiers associated with the particular route of the planned hike, from the social media content. Semantic analysis of the content and position of the words, "bridge", "landslide", and "lower path", reveals that a landslide damaged a bridge on the lower path of the planned hike area. Virtual overlay program 400 generates a text-based (or in other embodiments, an audio-based) message that a dated (one week old) posting indicates a bridge for water crossing on the lower path is damaged. Virtual overlay program 400 may also adjust the representation of the lower path, such as adding a caution or danger symbol, to indicate warning due to the reported bridge damage and possible additional damage from the reported landslide. In another embodiment of the present invention, if the content from the social media blog were dated ten months previous to the planned hike, the posting date may be more prominently displayed, to indicate the non-currency of the information to the user.

Having determined and analyzed data associated with the navigation route, virtual overlay program 400 determines if the path(s) are to be displayed (decision step 450), and receiving input to display one or more path images on AR display device 120 (step 450, "YES" branch) which, in one embodiment of the present invention, may be a specific hand or arm gesture detected by camera 123, virtual overlay program 400 determines the path(s) based on the received data of current location, destination, maps of the area, direction of view, and the view angle of incline (step 460). It should be noted that upon subsequent loops of virtual overlay program 400, once the images are displayed on AR display device 120, the images are repeatedly updated without user input from decision step 450. Decision step 450 remains receptive to user input, for example a pre-determined gesture identified by camera 123, and working in combination with decision step 470 determines if optional information has been selected for display, as discussed in detail below.

Virtual overlay program 400 generates path and route data based on receiving the current location, using the downloaded map data to position the user to the corresponding point on the map, determining the destination point relative to the map data, and orienting the map and position data based on the direction and incline of the view of AR display device 120. Virtual overlay program 400 includes information from social media analysis to determine if the path(s) to be displayed are to be augmented or modified based on conditions or experiences from the analysis of the social media content. In some embodiments of the present invention, virtual overlay program 400 may alter the display of a path or route to indicate attributes determined from data analysis. The attributes may be, for example, difficulty level or warning, and the attribute of the path or route may be presented by a different color or different pattern, such as a mixture of dashes and/or dots. For example, social media content directed to the particular route being traversed may describe a section of the route has become more difficult due to recent events, which may be fallen trees, wash-out of part of the trail, or ice build-up due to recent weather conditions.

In response to receiving the decision to display path virtual images, and determining the path images from the input of data, virtual overlay program 400 sends path overlay images to display on the real-world view to AR display device 120 (step 480). The virtual images of the determined path(s) are sent to AR display device 120 and are displayed, hands-free, as an overlay of the real-world view of the user. The path overlay images align with the view of the user such that if the view is away from the path position, the path is not displayed, and the display of the path adjusts to the direction and incline of view of AR display device 120. Having displayed the virtual path(s) or route images facilitating the traverse of the user of AR display device 120, virtual overlay program 400 returns to step 430 and continues to receive social media source input, update the current location, and perform analysis on the received GPS, map, and social media data (step 440), as described above; however, it is noted that additional loops of virtual overlay program 400, returning to step 430 after sending path overlay images to augmented display device 120, do not require user input to display path images. Path images continue to update based on detected location and social media content information.

For the case in which virtual overlay program 400 determines that the display of path(s) is not selected, (step 450, "NO" branch), virtual overlay program 400 determines whether a request to display information has been received (decision step 470). For the case in which displaying information has been requested (step 470, "YES" branch), virtual overlay program 400 sends to AR display device 120, the path information corresponding to the route being traversed, based on location, destination, social media, direction, and incline data (step 490). In some embodiments of the present invention, the information corresponding to the route traversed is sent to augmented display device 120 to be displayed concurrently with the path image.

Virtual overlay program 400 presents information associated with the route and the particular path of the route. In one embodiment of the present invention, the information is presented as text, and indicates warnings, attributes, conditions, or other information pertinent to the current location path, and may include information regarding optional paths, if available. In some embodiments, the route is one or a grouping of ski slopes, and virtual overlay program 400 may receive detailed ski maps and social media content as input to determine standard difficulty levels or conditions that apply to one or more particular ski slopes, such as icy conditions. In other embodiments, virtual overlay program 400 displays ski slope difficulty standards by presenting color-coded trail paths and trail symbol shapes overlaid on the viewing scene of the AR display device. For example, green paths and green circle indicate a ski trail designated for a beginner level, whereas a black path and black diamond indicate a skill trail for an expert. A user may benefit from the features of virtual overlay program 400 providing overlay images to an AR display device by viewing the difficulty level of multiple slopes by simply moving the direction of view, or by locating a slope of a specific difficulty by using features that overlay the path of the slope while removing obscuring scene elements (e.g. displaying the path of an expert slope located on the other side of the viewed mountain).

In other embodiments of the present invention, the designation of a particular attribute of a path or trail, for example difficulty level, is done by use of various dashes and/or dots to represent different paths or trails within the view of AR display device 120 as an alternative, or in combination with color-coding.

In some embodiments of the present invention, virtual overlay program 400 indicates conditions of trails or slopes, for example, which are more ideal in the early morning, or mid-afternoon, by applying distinguishing color codes to paths that are overlaid on the real-world view of AR display device 120. The conditions are determined by virtual overlay program 400 by semantic analysis of social networking input directed to the particular slope or trail, and the overlaid color path designates the respective timeframe of ideal conditions. By receiving and analyzing social media content associated with observed conditions of a particular trail or path at a certain time of day or time of year, virtual overlay program 400 may perform predictive analysis and indicate to a user the expected conditions. For example, multiple social media comments and posts indicate that trail XYZ, facing west, has icy conditions during the morning, but improves in the afternoon. Virtual overlay program 400 overlays a color-coded path line on trail XYZ indicating improved conditions in the afternoon. In other embodiments, information may be presented and displayed on AR display device 120 indicating higher or lower incidents of injury associated with a particular ski slope, and presents a warning color for the particular ski slope or may include a warning symbol that provides critical safety information.

In yet other embodiments, information associated with a chosen hiking trail route may indicate a distance to the nearest water crossing, or the distance to a loose rock field that is upcoming. Information determined and sent to AR display device 120 to be presented to a user may also include distance and elevation change from the current location to the destination, or statistical data for the number of people that have traversed the current path to reach the destination, for example. Information presented may be useful in decision making and providing a level of safety. In cases in which the availability of wireless connection to map data and social media sources is no longer available, virtual overlay program 400 relies on downloaded information from previous connected instances, and updates the current location from continuously available GPS data while in line of site positions with respect to an orbiting network of satellites.

Having presented the requested information, based on the data received, virtual overlay program 400 returns to step 430, and continues to receive social media source input, update the current location, and perform analysis on the received GPS, map, and social media data (step 440), and continues as described above. In response to path image or requested information being sent to augmented display device 120, virtual overlay program 400 continues to update location and social media content information and sends the updated information to augmented display device 120 for display, without repeated user input of decision step 450.

For the case in which virtual overlay program 400 determines that the display of information has not been requested (step 470, "NO" branch), virtual overlay program 400 returns to step 430, and continues to receive social media source input, and continues to update the current location and perform analysis on the received GPS, map, and social media data (step 440), and continues as described above.

Figure 5:
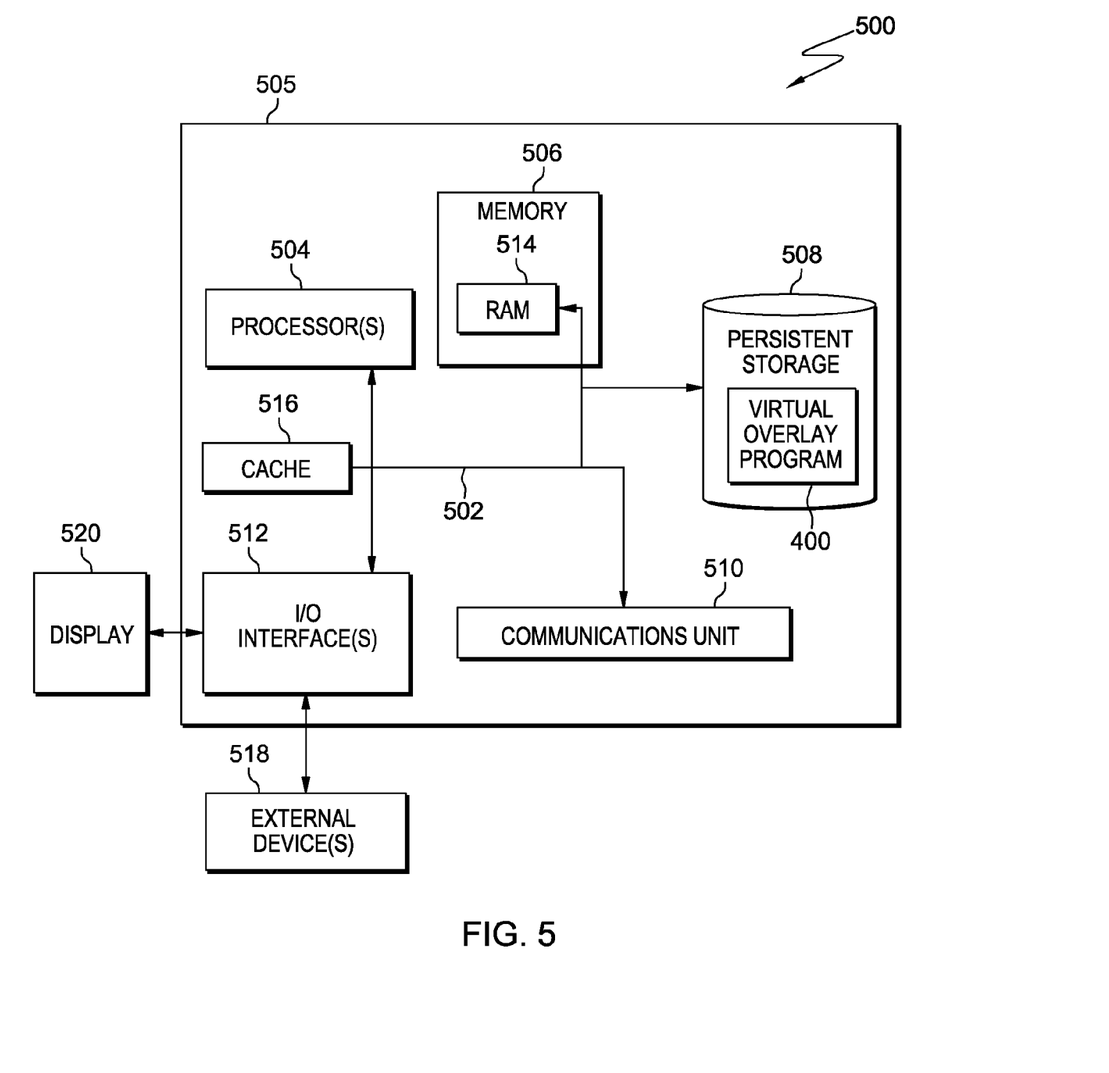
FIG. 5 depicts a block diagram of components of a computing device capable of operating the virtual overlay program, in accordance with an embodiment of the present invention.

FIG. 5 depicts a block diagram of components of computing system 500, capable of operating virtual overlay program 400, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Computing device 505 and computing device 110 include communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Virtual overlay program 400 is stored in persistent storage 508 for execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of distributed data processing environment 100. In these examples, communications unit 510 includes one or more network interface cards. Communications unit 510 may provide communications through the use of either or both physical and wireless communications links. Virtual overlay program 400 may be downloaded to persistent storage 508 through communications unit 510.

I/O interface(s) 512 allows for input and output of data with other devices that may be connected to client devices 110 and 120, and conversation hosting server 140. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., virtual overlay program 400 can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
a computing device operatively coupled to an augmented reality display device receiving a location of a user selected destination, a current location as determined by a global positioning service (GPS), map data corresponding to the current location and the user selected destination, a direction of view of the augmented reality display device, and a viewing angle of the augmented reality display device;
the computing device determining a path which connects the current location to the user selected destination, based on the map data that corresponds to the current location and the user selected destination, wherein the map data includes terrain and waterway information of an area including the current location and the user selected destination, and the path;
the computing device receiving social media content, wherein the social media content that is received relates to the area that includes the current location, the user selected destination, and the path connecting the current location and the user selected destination;
the computing device determining conditions and attributes associated with the area that includes the current location, the user selected destination, and the path, wherein the conditions and attributes are based on an analysis of the social media content that is received;
responsive to determining a predicted change to the conditions and attributes of the area that includes the path, the computing device determining whether the predicted change to the conditions and attributes of the area that includes the current location, the user selected destination, and the path, affects a difficulty level of the path, based on a semantic analysis and a sentiment analysis included within the analysis of the social media content that is received;
the computing device receiving a selection to display information indicating the conditions and attributes of the area that includes the current location, the user selected destination, and the path wherein the selection is based on a user gesture detected by a camera operatively coupled to and aligned with the direction of view of the augmented reality display device; and
responsive to the computing device receiving the user gesture, the computing device displaying the information indicating the conditions and attributes, and the predicted change to the conditions and attributes, of the area that includes the current location, the user selected destination, and the path, based on the analysis of the social media content, wherein the augmented reality display device displays the information indicating the conditions and attributes, the predicted change to the conditions and attributes affecting the difficulty level of the path, and a virtual image of the path, as a virtual overlay over a real-world view as seen through the augmented reality display device.

2. The method of claim 1, wherein the computing device receiving at least a portion of the information indicating the conditions of the path over a telecommunications network.

3. The method of claim 1, further comprising:
the computing device receiving input from a camera aligned with the direction of view and the incline angle of view of the augmented reality display device, wherein the input includes a recording by the camera of a new path traversed by a first person; and the computing device initiating a display of a virtual image of the new path overlaid on a real-world view of the augmented reality display device of a second person, based on the input of the recording of the new path traversed by the first person.

4. The method of claim 1, wherein analyzing the social media content, further comprises:

the computing device performing a syntactical analysis on the social media content in which a word type of each word within the social media content, a word position within the social media content, and phrases of the social media content are determined;

the computing device performing a semantic analysis in which a meaning associated with one or a combination of words of the social media content is determined;

the computing device identifying keywords and key phrases of the social media content relevant to the area of the current location and the user selected destination, based on the syntactical analysis and the semantic analysis;

the computing device performing the sentiment analysis of the social media content to determine an intent of the social media content relevant to the difficulty level of the path based on the conditions and attributes of the current location, the user selected destination, and the path; and the computing device determining the information indicating the conditions and attributes of the area that includes the current location, the user selected destination, and the path, based on results of the syntactical analysis, semantic analysis, and sentiment analysis applied to the social media content that is received.

5. The method of claim 1, wherein the computing device and the augmented reality display device are configured for option selection during operation by a user without requiring direct contact by the hands of the user of either or both of the augmented reality display device and the computing device, wherein the option selection is made by one or a combination of a predefined user movement from a group of: a hand gesture, an arm gesture, and a head-movement gesture, as detected by the camera included in the augmented reality display device.

6. The method of claim 1, wherein displaying the information indicating the conditions and attributes of the path to the augmented reality display device includes providing virtual overlays to the augmented reality display device of an indicator of dangerous conditions for the area of the path, and a separate indicator of dangerous conditions of the path, wherein an indicator can be one or a combination of a color coding, a symbol, and a text-based message.

7. The method of claim 1, wherein displaying the information indicating the conditions and the attributes of the path to the augmented reality display device includes providing virtual overlays to the augmented reality display device of an indicator of warning for areas of known accidents.

8. The method of claim 1, further comprising:

the computing device displaying the virtual image of the path, and the area of the path from the current location to the user selected destination, removing the display of real-world objects obstructing a view of the path.

9. A computer program product comprising:
a computer-readable hardware storage device having program instructions embodied therewith, wherein the program instructions are executable by a computer processor, the program instructions comprising:

program instructions for a computing device operatively coupled to an augmented reality display device to receive a location of a user selected destination, a current location as determined by a global positioning service (GPS), map data corresponding to the current location and the user selected destination, a direction of view of the augmented reality display device, and a viewing angle of the augmented reality display device;

program instructions to determine a path which connects the current location to the user selected destination, based on the map data that corresponds to the current location and the user selected destination, wherein the map data includes topography and feature information of an area including the current location and the user selected destination, and the path;

program instructions to receive social media content, wherein the social media content that is received relates to the area that includes the current location, the user selected destination, and the path connecting the current location and the user selected destination;

program instructions to determine conditions and attributes associated with the area that includes the current location, the user selected destination, and the path, wherein the conditions and the attributes are based on an analysis of the social media content that is received;

responsive to determining a predicted change to the conditions and attributes of the area that includes the path, program instructions to determine whether the predicted change to the conditions and attributes of the area that includes the current location, the user selected destination, and the path, affects a difficulty level of the path, based on a semantic analysis and a sentiment analysis included within the analysis of the social media content that is received;

program instructions to receive a selection to display information indicating the conditions and attributes of the area that includes the current location, the user selected destination, and the path wherein the selection is based on a user gesture detected by a camera operatively coupled to and aligned with the direction of view of the augmented reality display device; and responsive to the computing device receiving the user gesture, program instructions to display the information indicating the conditions and attributes, and the predicted change to the conditions and attributes, of the area that includes the current location, the user selected destination, and the path, based on the analysis of the social media content, wherein the augmented reality display device displays the information indicating the conditions and attributes, the predicted change to the conditions and attributes affecting the difficulty level of the path, and a virtual image of the path, as a virtual overlay over a real-world view as seen through the augmented reality display device.

10. The computer program product of claim 9, wherein analyzing the social media content, further comprises:

program instructions to perform a syntactical analysis on the social media content in which a word type of each word within the social media content, a word position within the social media content, and phrases of the social media content are determined;

program instructions to perform a semantic analysis in which a meaning associated with one or a combination of words of the social media content is determined;

program instructions to identify keywords and key phrases of the social media content relevant to the area of the current location and the user selected destination, based on the syntactical analysis and the semantic analysis; and program instructions to perform the sentiment analysis of the social media content to determine an intent of the social media content relevant to the difficulty level of the path based on the conditions and attributes of the current location, the user selected destination, and the path;

program instructions to determine the information indicating the conditions and attributes of the area that includes the current location, the user selected destination, and the path, based on results of the syntactical analysis, the semantic analysis and the sentiment analysis applied to the social media content that is received.

11. The computer program product of claim 9, wherein program instructions to display of the information indicating the conditions and attributes of the path to the augmented reality display device includes providing virtual overlays to the augmented reality display device of an indicator of dangerous conditions for the area of the path, and a separate indicator of dangerous conditions of the path, wherein an indicator can be one or a combination of a color coding, a symbol, and a text-based message.

12. The computer program product of claim 9, wherein program instructions to display of the information indicating the conditions and the attributes of the path to the augmented reality display device includes providing virtual overlays to the augmented reality display device of an indicator of warning for areas of known accidents.

13. A computer system for displaying a virtual path through an augmented reality display device, the computer system comprising:
 one or more computer processors;
 one or more computer readable, non-transitory storage media; and
 program instructions stored on the computer readable, media for execution by at least one of the one or more processors, the program instructions comprising:
  program instructions for a computing device operatively coupled to an augmented reality display device to receive a location of a user selected destination, a current location as determined by a global positioning service (GPS), map data corresponding to the current location and the user selected destination, a direction of view of the augmented reality display device, and a viewing angle of the augmented reality display device;
  program instructions to determine a path which connects the current location to the user selected destination, based on the map data that corresponds to the current location and the user selected destination, wherein the map data includes topography and feature information of an area including the current location and the user selected destination, and the path;
  program instructions to receive social media content, wherein the social media content that is received relates to the area that includes the current location, the user selected destination, and the path connecting the current location and the user selected destination;
  program instructions to determine conditions and attributes associated with the area that includes the current location, the user selected destination, and the path, wherein the conditions and the attributes are based on an analysis of the social media content that is received;
  responsive to determining a predicted change to the conditions and attributes of the area that includes the path, program instructions to determine whether the predicted change to the conditions and attributes of the area that includes the current location, the user selected destination, and the path, affects a difficulty level of the path, based on a semantic analysis and a sentiment analysis included within the analysis of the social media content that is received;
  program instructions to receive a selection to display information indicating the conditions and attributes of the area that includes the current location, the user selected destination, and the path wherein the selection is based on a user gesture detected by a camera operatively coupled to and aligned with the direction of view of the augmented reality display device; and
  responsive to the computing device receiving the user gesture, program instructions to display the information indicating the conditions and attributes, and the predicted change to the conditions and attributes, of the area that includes the current location, the user selected destination, and the path, based on the analysis of the social media content, wherein the augmented reality display device displays the information indicating the conditions and attributes, the predicted change to the conditions and attributes affecting the difficulty level of the path, and a virtual image of the path, as a virtual overlay over a real-world view as seen through the augmented reality display device.

14. The computer system of claim 13, wherein program instructions to display of the information indicating the conditions and attributes of the path to the augmented reality display device includes providing virtual overlays to the augmented reality display device of an indicator of dangerous conditions for the area of the path, and a separate indicator of dangerous conditions of the path, wherein an indicator can be one or both of a color coding and a symbol.

15. The computer system of claim 13, wherein program instructions to display of the information indicating the conditions and the attributes of the path to the augmented reality display device includes providing virtual overlays to the augmented reality display device of an indicator of warning for areas of known accidents.

* * * * *